Patented Aug. 31, 1943

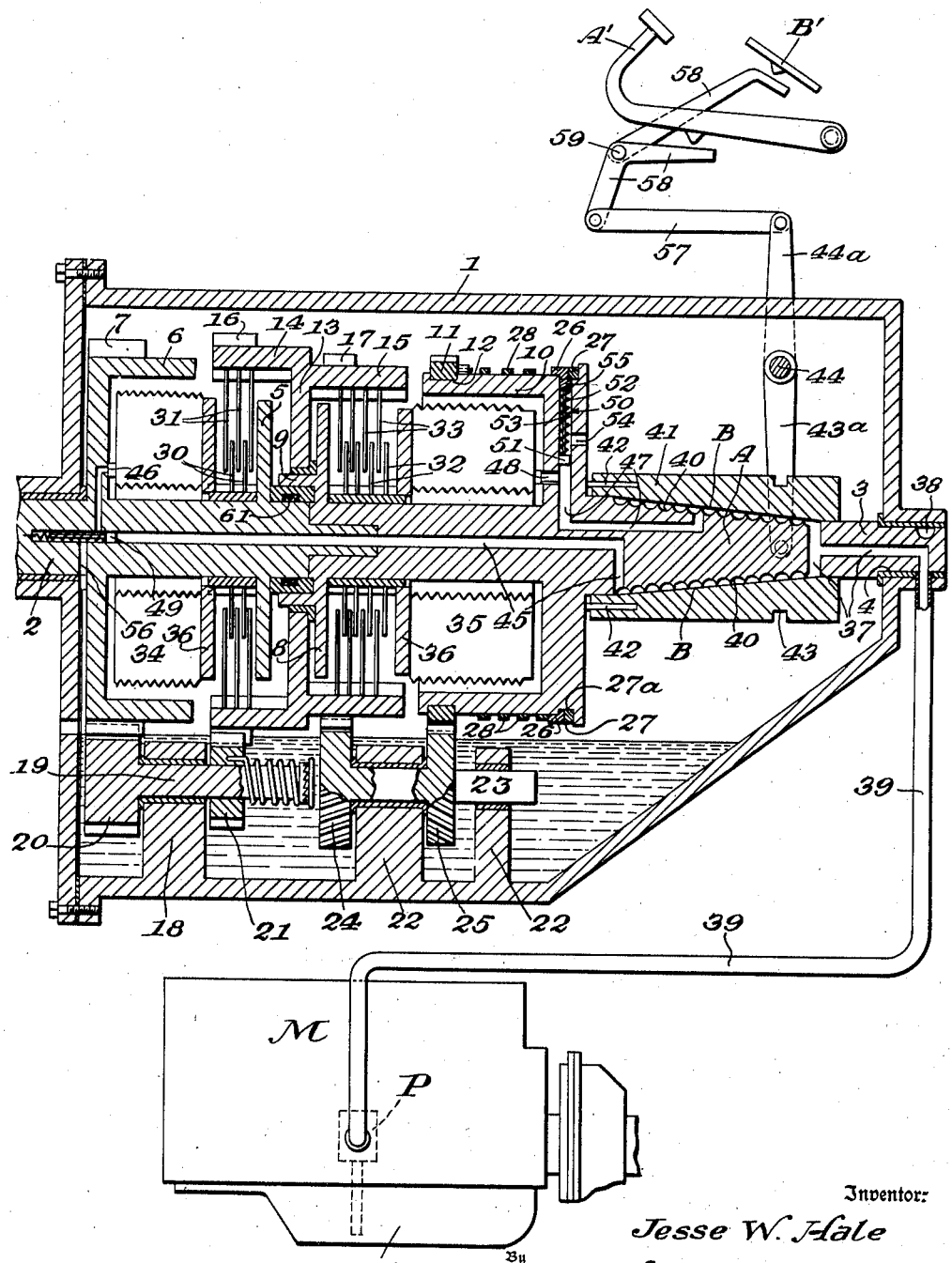

2,328,273

UNITED STATES PATENT OFFICE 2,328,273

CHANGE SPEED DEVICE

Jesse W. Hale, Newton, Mass.

Application November 18, 1940, Serial No. 366,069

10 Claims. (Cl. 74—472)

This invention relates to change speed devices and is a continuation in part of my Letters Patent No. 2,245,857, granted June 17, 1941.

My present invention relates particularly to means for operating a change speed device in which the shaft connecting mechanism is actuated by fluid pressure operable devices. In accordance with my present invention, I use for a source of fluid under pressure, the engine lubricating system. Such systems include a pump maintaining the lubricating fluid under a fairly constant pressure and this presure is varied by a pump responsive to the speed of the driven shaft to effect the operation of the pressure operable devices. In addition, I employ an operator control to vary the pressure of the delivered fluid so that change speed devices embodying my invention may be flexible in operation.

To illustrate my invention I have shown in the accompanying drawing, the fluid pressure operated change speed device of my above identified co-pending application.

The single figure of the drawing is a section through a change speed device and showing the source of fluid pressure and the operator control for varying the delivered fluid pressure.

The change speed device shown in the drawing includes a casing 1 having aligned ports for the drive shaft 2 and the driven shaft 3. Bushings are indicated at 4.

The drive shaft 2 is provided adjacent its inner end with a flange 5 and also carries a rim member 6 presenting an annular recess disposed towards the flange 5. The member 6 includes a gear 7.

The driven shaft 3 includes a flange 8 including a rim 9. The driven shaft 3 carries a rim member 10 presenting an annular recess disposed towards the flange 8. A gear 11 is loosely mounted in a groove 12 in the rim member 10.

An intermediate member 13 is mounted on the rim 9 for rotation independently thereof and includes rim portions 14 and 15 presenting annular recesses disposed towards the annular recesses of the rim members 6 and 10, respectively. The rim portions 14 and 15 include gears 16 and 17, respectively.

At 18 I have shown a bracket secured to the casing 1 which supports the shaft 19 carrying idler gear assembly 20 and 21 in mesh with the gear 7 and 16, respectively. At 22 I have shown brackets supporting the shaft 23 carrying idler gear assembly 24 and 25 in mesh with the gears 17 and 11, respectively.

As will be subsequently explained, when the intermediate member 13 rotates at the same speed as the drive shaft 2 and when the driven shaft 3 and the intermediate member 13 rotate at the same speed, the gears of the idler assembly meshing with the gears 16 and 11 on the intermediate member 13 and on the rim member 10, cannot rotate at the same speed as the idlers are of different sizes. Consequently, in order to prevent locking, either the driving idler gear member, under these circumstances, must be capable of being rotated independently of its shaft, or the driven gear must be capable of permitting independent rotation of the member which it rotates.

In Fig. 1 I have shown both constructions as the gear 21 is loosely mounted on its shaft 19 and the gear 11 is loosely mounted on the rim member 10. As the one-way clutches to lock the gears to the members on which they are loosely mounted are identical in either case, and either construction may be used, a description of the one-way clutch locking the gear 11 to the rim member 10 as shown in Figs. 4 and 5 will be sufficient to enable the one-way clutch to be fully understood.

Ring members 26 and 27 are loosely mounted in a groove 27ª in the rim member 10. The ring 26 is connected to the gear 11 by a spring 28 spirally disposed about the rim member 10 to act as a coil clutch. The ring members 26 and 27 have inclined surfaces 29 which, when the idler gear 25 is rotated to drive the rim member 10, are wedged apart to lock in the groove 27ª and thus tighten the coil clutch 28 gradually to rotate the member 10 with the gear 11.

When, as will be later explained, the rim member 10 is locked to rotate with the intermediate member 13, the rotation of the rim member 10 will free the interlock of the ring members 26 and 27 and thus release the coil clutch 28 to permit the free rotation of the rim member 10 within the gear 11.

Clutch plates 30 and 31 are slidably mounted on the drive shaft 2 and the rim portion 14, respectively, establishing a clutch to lock the intermediate member 13 to the drive shaft 2. Clutch plates 32 and 33 are slidably mounted on the driven shaft 3 and the rim portion 15 establishing a clutch to lock the intermediate member 13 to the driven shaft 3.

Within the annular spaces presented by the rim members 6 and 10, I position annular pressure operable expansible members 34 and 35, each of which includes a contact ring 36 to slide the clutch plates against the adjacent shaft flange.

The driven shaft 3 is formed with a taper A adjacent the rear end of which is a conduit 37 extending axially through the shaft and in communication with a ring-shaped groove 38. As a suitable source of fluid I employ the crank case C of the motor M as this has an oil pump indicated at P deliverying the lubricating oil to the motor under a substantially constant pressure. Fluid under pressure is delivered from the pump P to the ring-shaped groove 38 through the conduit 39. The tapered portion A of the driven shaft 3 is formed with grooves 40 spiralling towards the forward part of the tapered portion A.

A casing 41 fits the driven shaft 3 on each end of the tapered portion A and is interiorly formed as at B with the same taper as that of the driven shaft 3 at A. The casing 41 is slidable relative to the driven shaft 3 being mounted on pins 42 carried by the rim member 10 to ensure its rotation with the shaft 3. A groove 43 in the casing 41 receives the ends of a fork 43ª carried by a shaft 44 through the casing 1 which may be actuated by the operator to move the casing 1 rearwardly as shown in Fig. 1, to modify the clearance between the casing or stem 41 and the spiral grooves 40 and to vary the effectiveness of the spiral grooves 40 in controlling the operating pressures. The shaft 44 extends through the casing 1 and carries the lever 44ª for actuation by the operator by mechanism to be later described.

A conduit 45 extends from the inner end of the tapered portion A through the shafts 3 and 2 and through the rim member 6 where it is provided with an outlet port 46 to the expansible member 34. A conduit 47 extends from substantially the middle of taper A through the drive shaft 3 and the rim member 10 and is there provided with an outlet port 48 to the expansible member 35.

The conduits 45 and 47 are provided with substantially identical valves 49 and 50, respectively. A valve member 51 under the influence of a spring 52 normally is positioned in the conduit 47 to close the flow of fluid through the outlet 48. When the resistance of the spring 52 is overcome, fluid is admitted to the expansible member 35 while the valve stem 53 limits the movement of the valve 51 to prevent the relief port 54 being connected to the pressure delivery conduit 47. Fluid may pass through the relief port 54 when the compressible member 52 overcomes the fluid pressure and carries the valve 51 to a position closing the conduit 47 from the outlet 48 and connecting the outlet 48 to the relief port 54. A plug 55 is adjustably threaded in the conduit 47 to permit the resistance of the spring 52 to be varied. I have indicated the relief port for the valve 49 at 56. Fluid may return to its source through an outlet R in the casing 1.

In operation it will be assumed for purposes of explanation only that my invention is embodied in a motor vehicle which is at rest and that the main clutch, not shown, is engaged.

The drive shaft 2 rotates the intermediate member 13 at a ratio determined by the gears 7, 20, 21 and 16, which ratio may be assumed to be 2:1. The driven shaft is rotated by the intermediate member 13 at a ratio determined by the gears 17, 24, 25, and 11, which ratio may be assumed to be 2:1 with the resulting ratio between the shafts 2 and 3 of 4:1 or a suitable low speed. The gear 21 on rotation of the gear 20 and the shaft 19, is locked to the shaft 19 by the one-way clutch since the wedging rings 26 and 27 spread and lock in the groove 27ª. The spring 28 is then tightened by the rotation of the shaft 19 so that the gear 21 is locked thereon. It will be understood that the one-way clutch locking the gear 21 to the shaft 19 is identical to the one-way clutch locking the gear 11 to the rim member 10.

The rotation of the spiral grooves 40 impels the fluid along the grooves 40 with an increase in pressure depending on the driven shaft 3 and the position of the casing 41 relative to the grooves 40.

When a sufficient pressure is built up to actuate the valve 49, fluid under pressure is admitted to the expansible member 34 actuating the clutch plates 30 and 31 to lock the intermediate member 13 to the drive shaft 2. As there is now no gear reduction possible between the member 13 and the shaft 2, the one-way clutch connecting the gear 21 to its shaft 19 is released permitting the gear 21 to rotate independently thereof. The ratio between the drive shaft 2 and the driven shaft 3 will now be 2:1 or a suitable intermediate speed.

Further increase of driven shaft speed will result in increased pressure of the fluid in the grooves 40 until a sufficient pressure exists in the conduit 47 to actuate the valve 50 to admit fluid pressure to the expansible member 35 to actuate the clutch plates 32 and 33 to lock the intermediate member 13 to the driven shaft 3 effecting direct drive, the one-way clutch previously locking the gear 10 to the rim member 11 now being released. Since the valve 50 must be actuated subsequent to the valve 49, the conduit 47 communicates with the middle of the taper A where a lesser pressure exists requiring a higher speed to develop the same pressure.

If the position of the casing 41 be varied and clearance exists between the casing 41 and the grooves 40 greater driven shaft speeds are required to develop desired operating pressure so that the gear ratio changes while automatically effected may be dominated as required by the operating conditions.

In the drawing I have suggested mechanism by which this result may be accomplished in relation to the torque. I provide an arm 57 pivotally connected to the lever 44ª and to a bell crank lever 58, the pivoted support for which is indicated at 59. The bell crank lever 58 is actuated as the accelerator A' or the brake B' is depressed by the operator.

It will be appreciated that the nature of the expansible members 34, 35 is such that the pressure on the clutch plates is very quickly reduced when pressures thereon are released. It will also be appreciated that the one-way clutches are effective to cushion the shock of load assumption.

At 61 I have indicated a one-way clutch between the rim 9 and the drive shaft 2 which may be used to prevent "free wheeling" and to permit the drive shaft 2 and the driven shaft 3 to be rotated reversedly should a reversing unit be placed forwardly of the casing 1.

What I therefore claim and desire to secure by Letters Patent is:

1. In a change speed device for a vehicle, the prime mover of which has a source of lubrication under constant pressure when the prime mover is in operation, a drive shaft and driven shaft, means to connect said shafts at different ratios, fluid pressure operable means to actuate said connecting means, said fluid pressure operable means being operable at a pressure in excess of that of said source, centrifugally operable means delivering fluid from said source to said pressure operated means at an increased pressure determined by said driven shaft speed.

2. In a change speed device for a vehicle, the prime mover of which has a source of lubrication under constant pressure when the prime mover is in operation, a drive shaft and driven shaft, means to connect said shafts at different ratios, means to operate said connecting means including a pressure operable device, said fluid pressure operable device being operable at a pressure in excess of that of said source, means delivering fluid from said source to said pressure operable device at an increased pressure determined by said driven shaft speed, and an operator actuated control to vary the action of said last-named means in relation to the desired speed of the prime mover.

3. In a change speed device, a drive shaft, a driven shaft, means to connect said shafts at different ratios, means operable by liquid pressure to actuate said connecting means, a source of liquid and means delivering liquid from said source to said pressure operable means, said means comprising a primary pump maintaining a constant liquid pressure in said delivery means insufficient to operate said pressure operable means, and means responsive to the speed of said driven shaft to increase the pressure of the liquid sufficiently to operate said pressure operable means.

4. In a change speed device, a drive shaft, a driven shaft, means to connect said shafts at different ratios, means operable by liquid pressure to actuate said connecting means, a source of liquid and means delivering liquid from said source to said pressure operable means, said means comprising a primary pump maintaining a constant liquid pressure in said delivery means insufficient to operate said pressure operable means, means responsive to the speed of said driven shaft to increase the pressure of the liquid sufficiently to operate said pressure operable means, and operator controlled means for freely varying the action of said speed responsive means as required by operating conditions.

5. In a change speed device for a vehicle, the prime mover of which has a source of lubricant under constant pressure when the prime mover is in operation, a casing, a drive shaft, a driven shaft, means within said casing to connect said shafts, means to operate said connecting means including a pressure operable device operable at a pressure in excess of that of said source, means delivering fluid from said source to said pressure operable device, said means including a pump within said casing responsive to the speed of said driven shaft to increase the pressure of the lubricant, and means including an operator control exteriorly of said casing for varying the action of said pump in relation to the desired speed of the prime mover.

6. In a change speed device for a vehicle having a drive shaft, a driven shaft, and controls operable by the operator for controlling the speed of said drive shaft, said device comprising a casing, means within said casing to connect said shafts at different ratios, means to operate said connecting means including a pressure operable valve, a source of liquid, a pump in control of said source to maintain said source under a constant pressure, and means to deliver said liquid under pressure from said source to said valve, said liquid delivery means including means responsive to the speed of said driven shaft to vary the pressure of the delivered liquid to render it effective to operate said valve.

7. In a change speed device for a vehicle having a drive shaft, a driven shaft, and a control operable by the operator for controlling the speed of said drive shaft, said device comprising a casing, means within said casing to connect said shafts at different ratios, means to operate said connecting means including a pressure operable valve, a source of liquid, a pump in control of said source to maintain said source under a constant pressure, means to deliver said liquid under pressure from said source to said valve, said liquid delivery means including means responsive to the speed of said driven shaft to vary the pressure of the delivered liquid to render it effective to operate said valve, and said control cooperating with said speed responsive means to vary the driven shaft speed at which said pressure operable valve is operated.

8. In a change speed device for a vehicle having a drive shaft, a driven shaft, and a control operable by the operator for controlling the speed of said drive shaft, said device comprising a casing, means within said casing to connect said shafts at different ratios, means to operate said connecting means including a pressure operable valve, a source of liquid, a pump in control of said source to maintain said source under a constant pressure, means to deliver said liquid under pressure from said source to said valve, said liquid delivery means including means responsive to the speed of said driven shaft to vary the pressure of the delivered liquid to render it effective to operate said valve, means cooperating with said speed responsive means to vary the driven shaft speed at which said pressure operable valve is operated, and said means being operatively connected to said controls of the drive shaft speed for actuation simultaneously therewith.

9. In a change speed device for a vehicle having a drive shaft, a driven shaft, and controls operable by the operator for controlling the speed of said drive shaft, said device comprising a casing, means within said casing to connect said shafts at different ratios, said means including a friction coupling on said drive shaft, a friction coupling on said driven shaft, hydraulic pressure means to render said couplings effective, a pressure operable valve in control of said hydraulic pressure means responsive to the speed of said driven shaft to increase the pressure to operate said pressure operable valve, and means operable by said control to vary the action of said shaft connecting means.

10. In a change speed device for a vehicle having a drive shaft, a driven shaft, and controls operable by the operator for controlling the speed of said drive shaft, said device comprising a casing, means within said casing to connect said shafts at different ratios, said connecting means including an intermediate member and means to connect said intermediate member with said drive shaft and said driven shaft, means to operate said connecting means including a pressure operable valve, a source of liquid, a pump in control of said source to maintain said source under a constant pressure, and means to deliver said liquid under pressure from said source to said valve, said liquid delivery means including means responsive to the speed of said driven shaft to vary the pressure of the delivered liquid to render it effective to operate said valve.

JESSE W. HALE.